Patented Feb. 15, 1927.

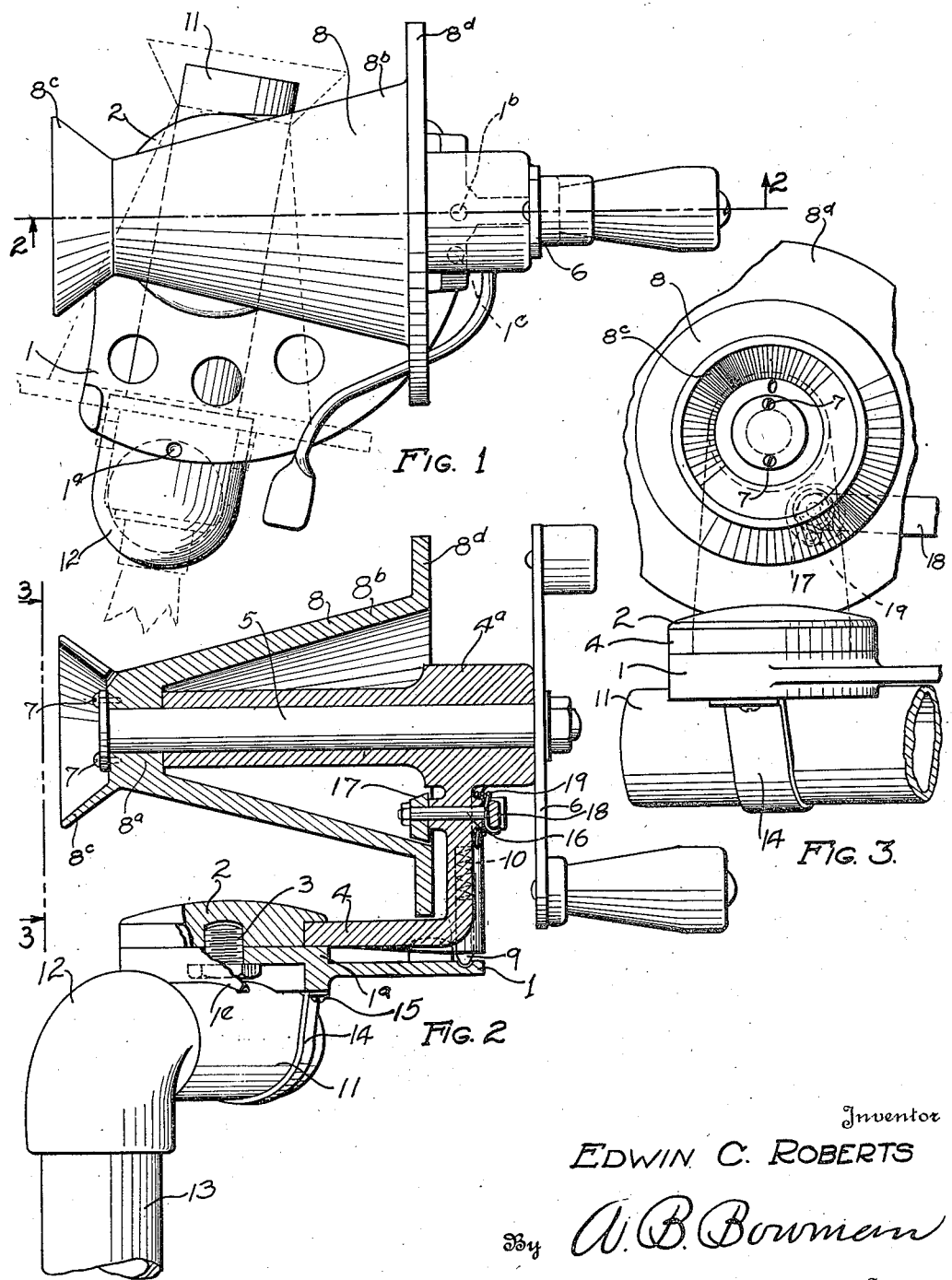

1,617,543

UNITED STATES PATENT OFFICE.

EDWIN C. ROBERTS, OF SAN DIEGO, CALIFORNIA.

FISHING REEL.

Application filed October 22, 1925. Serial No. 64,213.

My invention relates to fishing reels, and the objects of my invention are: first, to provide a reel of this class whereby the line may be cast out or unwound from the reel or winding drum without rotating the same, thus doing away with the tangling of the fish-line when the line is cast out or unwound from the reel or winding drum, as in the conventionally constructed and operated fishing reel; second, to provide a fishing reel in which the line carrying drum is pivotally mounted on a transverse axis and adapted to be substantially fixed in slightly rotated positions, so that the line, when winding the same on the drum, will be wound evenly from one side to the other, the direction of winding of the line being determined by the angular position of the reel about its transverse pivotal axis; third, to provide a fishing reel which is provided with a substantially open end, whereby no obstruction is provided at said end, when the reel is positioned at a substantial right angle to its ordinary winding position, when desiring to cast out or unwind the line from the reel; fourth, to provide a fishing reel having a substantially conically shaped drum provided at its small end with another portion of a substantially conically shaped drum, but positioned in reverse relation and secured to the first mentioned drum, the latter conically shaped portion serving as means to retain the line on the first mentioned substantially conically shaped drum when winding the line on the latter, but permitting also free unwinding of the fish-line from the latter when desired and when the axis of the reel is positioned in line with the pole or in line with the direction of the cast for unwinding; fifth, to provide novel means for supporting my fishing reel either by hand or in the ground when a pole is not desired to be used; sixth, to provide a novelly arranged brake mechanism in connection with a reel of this class; seventh, to provide as a whole a novelly constructed fishing reel, and eighth, to provide a fishing reel of the class mentioned, which is particularly simple and economical of construction, durable, efficient, practical, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of my fishing reel supported and secured at the upper end of my novel reel supporting means, showing by dotted lines the reel shifted to a position for casting or unwinding of the line from the reel; Fig. 2 is a partial sectional and partial elevational view thereof, taken through 2—2 of Fig. 1, and Fig. 3, is a fragmentary end view of my fishing reel, taken at 3—3 of Fig. 2.

Like characters of reference refer to similar parts and portions throughout the several views of the drawings.

The supporting member 1 of my fishing reel structure consists of a plate provided with a hollow upwardly extending boss $1^a$. At the upper end of the hollow boss $1^a$ is secured a cap 2 by means of a cap screw 3, the head of which screw is positioned in the hollow portion at the under side of the boss $1^a$. On the boss $1^a$ and around a groove portion of the cap 2 is rotatably mounted the one end of the drum supporting bracket 4, which is bent upwardly at a right angle some distance from its pivotal axis. At the upper end of the right angle portion of the bracket 4 is provided a relatively long journal portion $4^a$, which extends back or over and beyond the pivotal axis of the bracket, as shown best in Fig. 2. In this journal portion $4^a$ is revolubly mounted a spindle 5, to the outer end of which is secured a balanced crank handle 6. The opposite end of the spindle 5 extends through and is secured, by means of screws 7, to the hub $8^a$ of the fish-line drum 8.

The fish-line drum 8 consists mainly of a hollow frusto-conically shaped portion $8^b$, the small end of which is secured to the hub $8^a$ and the other large end of which extends over the journal portion $4^a$ of the bracket 4. The inclination of the face of the portion $8^b$ is relatively slight, permitting the fish-line to be readily wound thereon. At the small end of the portion $8^b$ of the drum is secured the small end of another frusto-conically shaped portion $8^c$, which serves substantially as a flange or as a retaining means for the fish-line wound at the small end of the portion 8ᵇ of the drum. At the large end of the drum portion 8ᵇ is provided a relatively large, annular, retaining flange 8ᵈ.

In the upright or right angle portion of the bracket 4 is provided a recess in which is reciprocally mounted a bracket positioning plunger 9, which is held in an outward or downward position by means of a compression spring 10 positioned within the recess, as shown best in Fig. 2. The plunger 9 is adapted to engage notched portions 1ᵇ, 1ᶜ and 1ᵈ, as shown in Fig. 1, to retain the bracket 4 and the drum mounted thereon in various positions relatively to the supporting means.

My fishing reel is adapted to be used in connection with fish poles as any other reels now in use, but is also particularly adapted to be used in connection with a particular reel supporting means illustrated in the drawings. This means consists of a short pipe section 11, secured, by means of an elbow 12, to a relatively long upright pipe section 13 for gripping the means or for supporting the reel in the sand at the shore. The pipe section 11 fits into a grooved portion 1ᵉ at the under side of the hollow boss 1ᵃ and is secured in position in this groove by means of a strap 14 extending around the member 11 and secured, by means of screws 15, to the lower end of the boss 1ᵃ.

I have also provided a brake mechanism for my reel, which consists of a spindle 16 extending transversely through the upright or right angle portion of the bracket 4, a brake member 17 and a brake lever 18. The brake member 17 is secured to the inner end of the spindle 16, the periphery of which is preferably conical to conform with the interior of the conical drum portion 8ᵇ and is eccentrically mounted on the spindle so as to engage the interior surface of the drum 8, when the lever 18, secured at the opposite end of the spindle 16, is depressed at its outer end. Around the boss of the bracket, through which the spindle 16 extends, and around the hub of the lever 18 connected to the spindle 16, is positioned a torsion spring 19, which is adapted to keep the brake member 17 in disengaged relation relatively to the inner portion of the drum 8.

The position of the winding drum or reel member 8, shown by solid lines in Fig. 1, is such that the line is adapted to be wound to the right when the crank handle 6 is rotated in a clockwise direction. When the drum is shifted clockwise about its pivotal axis on the cap 2 so that the plunger 9 engages the notched portion 1ᶜ, and the crank handle 6 rotated in a clockwise direction, the fish-line is adapted to be wound on the drum to the left. When the drum is shifted to the dotted line position shown in Fig. 1, the reel is in a position for casting or for throwing the line outwardly into the water or unwinding the same from the reel. Such unwinding of the line from the reel, as stated, will not tangle the line in any way.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a fishing reel structure, a revolubly mounted winding drum, the main portion of which is frusto-conically shaped, said drum being pivoted on an axis transverse with its axis of revolution.

2. In a reel structure, a journal member, a winding drum revolubly mounted thereon, said winding drum having a substantially frusto-conically shaped drum portion having at its small end a relatively small, substantially frusto-conically shaped drum portion secured in reverse order to said first mentioned drum portion and having at its large end a retaining flange, and means for rotating said drum on said journal portion.

3. In a reel structure, a journal member, a winding drum revolubly mounted thereon, said winding drum having a substantially frusto-conically shaped drum portion having at its small end a relatively small, substantially frusto-conically shaped drum portion secured in reverse order to said first mentioned drum portion and having at its large end a retaining flange, and a supporting member provided with an axis at right angles with the axis of revolution of said drum upon which said journal member is pivotally mounted.

4. In a reel structure, a journal member, a winding drum revolubly mounted thereon, said winding drum having a substantially frusto-conically shaped drum portion having at its small end a relatively small, substantially frusto-conically shaped drum portion secured in reverse order to said first mentioned drum portion and having at its large end a retaining flange, a supporting member provided with an axis at right angles with the axis of revolution of said drum upon which said journal member is pivotally mounted, and means secured to said supporting member and extending downwardly therefrom for supporting the reel in an upright manner.

5. In a reel structure, a journal member, a winding drum revolubly mounted thereon, said winding drum having a substantially frusto-conically shaped drum portion having at its small end a relatively small, substantially frusto-conically shaped drum portion secured in reverse order to said first mentioned drum portion and having at its large end a retaining flange, a supporting member provided with an axis at right angles with the axis of revolution of said drum upon which said journal member is pivotally mounted, and plunger and spring means in connection with said journal member and said supporting member for retaining said journal member in various shifted positions.

6. In a reel structure, a journal member, a winding drum revolubly mounted thereon, said winding drum having a substantially frusto-conically shaped drum portion having at its small end a relatively small, substantially frusto-conically shaped drum portion secured in reverse order to said first mentioned drum portion and having at its large end a retaining flange, a supporting member provided with an axis at right angles with the axis of revolution of said drum upon which said journal member is pivotally mounted, a brake member pivotally mounted on said journal member and extending into said drum, and a brake lever extending from the pivotal axis of said brake member to the rear end of said supporting member.

7. In a reel structure of the class described, a supporting member, a bracket pivotally mounted at its one end on said supporting member and provided at its upper end with a long journal portion, a drum provided at its one end with a hub portion provided with an extended spindle revolubly mounted in said journal portion, said drum flaring outwardly and axially from said hub portion forming an extended, frusto-conically shaped winding portion and a frusto-conically shaped line retaining portion at the small end of the former, said frusto-conically shaped winding portion extending over the long journal portion of said bracket, and a crank handle secured to said spindle at the end thereof extending beyond the large end of said frusto-conically shaped drum portion.

8. In a reel structure of the class described, a supporting member, a bracket pivotally mounted at its one end on said supporting member and provided at its upper end with a long journal portion, a drum provided at its one end with a hub portion provided with an extended spindle revolubly mounted in said journal portion, said drum flaring outwardly and axially from said hub portion forming an extended, frusto-conically shaped winding portion and a frusto-conically shaped line retaining portion at the small end of the former, said frusto-conically shaped winding portion extending over the long journal portion of said bracket, a crank handle secured to said spindle at the end thereof extending beyond the large end of said frusto-conically shaped drum portion, and a right angle reel support provided with a short horizontal arm at its upper end and a relatively long, vertical arm, said short arm being secured to said supporting member and said long arm being adapted to be supported in a vertical position.

In testimony whereof, I have hereunto set my hand at San Diego, California, this 12th day of October, 1925.

EDWIN C. ROBERTS.